July 25, 1950     J. R. LOWRY     2,516,328
PULSATOR APPARATUS FOR MILKING MACHINES
Filed July 30, 1947

INVENTOR
Jesse R. Lowry
By Rudolph L. Lowell
ATTY.

Patented July 25, 1950

2,516,328

UNITED STATES PATENT OFFICE 2,516,328

PULSATOR APPARATUS FOR MILKING MACHINES

Jesse R. Lowry, Des Moines, Iowa

Application July 30, 1947, Serial No. 764,870

1 Claim. (Cl. 31—62)

This invention relates generally to milking machines and in particular to a pulsator apparatus for a milking machine.

An object of this invention is to provide an improved milking machine of the pulsator type.

A further object of this invention is to provide a pulsator apparatus for a milking machine in which the alternately high and low working pressures of a reciprocating pump are utilized to operate inflation type teat cups and to provide for the air in the space of a milk receptacle being at a sub-atmospheric pressure.

Another object of this invention is to provide a pulsator apparatus for a milking machine which is of a simple and compact construction, and has all of the fluid passages therein readily accessible for cleaning purposes.

A feature of this invention is found in the provision of a pulsator apparatus for a milking machine in which a valve unit carried on the cover of a milk receptacle is formed with an air chamber having three air connections; a first one of which is connected with the main air tube of a claw assembly, and a second of which is open to the receptacle space. The third connection is connected with a reciprocating pump so as to be acted on by the alternately high and low working pressures of the pump. A one-way valve member in the second air connection controls the flow of air therethrough and is in a closed position when high pressure air is supplied to the valve unit chamber, so that air is exhausted from the receptacle during each low working pressure or suction cycle of the pump. As a result air at alternately high and low pressure is supplied to the claw air tube and the air in the receptacle space is maintained at a sub-atmospheric pressure. A fluid connection between the receptacle space and the claw milk tube provides for the flow of milk into the receptacle.

Further objects, features and advantages of this invention will become apparent from the following description when taken in connection with the accompanying drawings, in which.

Figure 1:
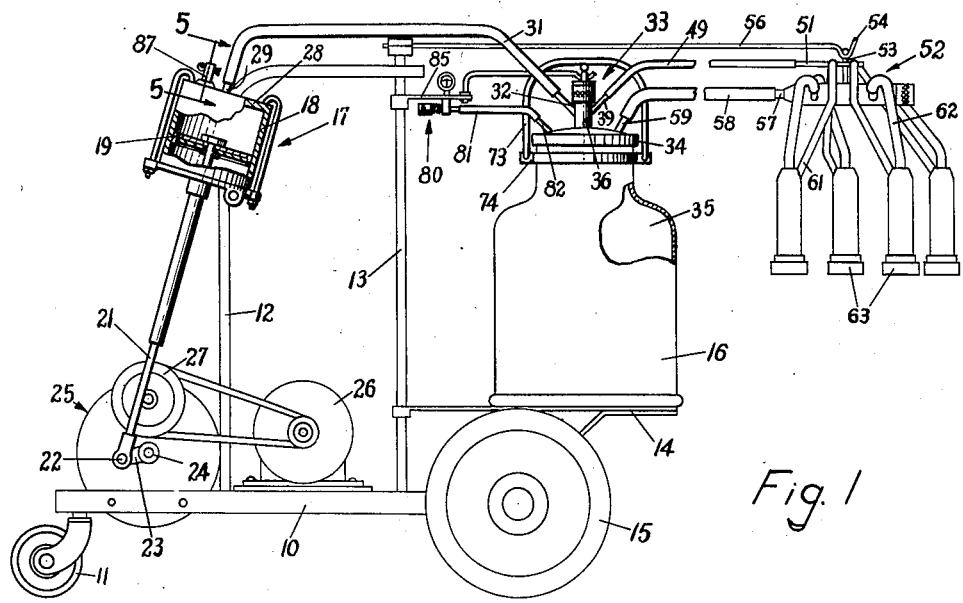
Fig. 1 is a side elevational view of a portable milking machine embodying the pulsator apparatus of this invention, with certain parts being broken away to more clearly show its construction.

With reference to the drawings, the pulsator apparatus of this invention is illustrated in Fig. 1, as applied to a portable milking machine having a base or frame 10 supported on a front caster wheel 11, and rear wheels 15. The frame 10 has a pair of upright longitudinally spaced supports or standards 12 and 13, with the rear standard 13 being provided with a rearwardly extended platform 14 for carrying a milk receptacle 16.

The pulsator apparatus includes a reciprocating pump, designated generally as 17, having a cylinder 18 and a piston 19. The pump is suitably secured adjacent the upper end of the front standard 12, and the piston rod 21 extends downwardly and forwardly for the pivotal connection of its lower end at 22 with the free end of a crank arm 23 mounted on the power take off shaft 24 of a speed reduction mechanism, indicated generally as 25, and mounted on the frame 10 ahead of the front standard 12. An electric motor 26, arranged on the frame 10 between the standards 12 and 13, is belt connected with a driven pulley 27 which forms part of the speed reduction mechanism 25.

The top wall or head 28 of the cylinder 18 has a single air connection 29 which is connected through a flexible tube or conduit 31 with a front air connection 32 formed as part of a valve unit 33 carried on a cover 34 for the milk receptacle 16.

Figure 3:
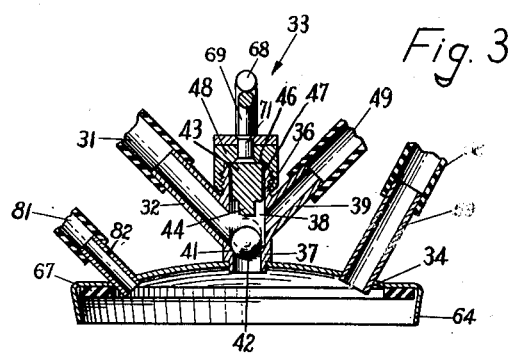
Fig. 3 is an enlarged vertical longitudinal sectional view of a valve unit and receptacle cover assembly, shown generally in Fig. 1, and forming part of the pulsator apparatus.

The valve unit 33 (Figs. 1 and 3) includes an upright tubular body member 36 having its lower end 37 extended through the cover 34 so as to be open to the space 35 within the receptacle. The front air connection 32 has its inner end open to the air chamber or passage 38, within the tubular member 36, and is oppositely arranged from a rear air connection 39, which also has its inner end open to the air passage 38. As best appears in Fig. 3, the inner ends of the front air connection 32 and the rear air connection 39 are open to the passage 38 at positions spaced from the lower end 37 of the body member 36.

A one-way valve for controlling the flow of air through the lower end 37 of the tubular member 36, includes a valve seat 41 formed at such lower end and adapted to receive in seated engagement a ball valve 42, which is insertable into the passage 38 through the upper end of the tubular member 36. It is seen, therefore, that the ball 42 is movable upwardly to open the lower end 37 of the tube 36.

The upper end of the tube 36 (Fig. 3) is fluid sealed by removable means comprising a combination stop and sealing member 43, of a substantially cylindrical shape, having its lower end 44 of a reduced section and a valve portion 46 at its upper end adapted to be seated in a seat 47 formed at the upper end of the tubular body member 36. The valve portion 46, of the combination member 43, is maintained in fluid sealed engagement with the seat 47 by a cap member 48 screwed about the upper end of the tubular body member 36.

The reduced section 44, of the combination member 43, terminates at a spaced position above the seat 47, at the lower end 37 of the tubular member 36, and constitutes a stop for limiting the upward movement of the ball valve 42.

The rear air connection 39, on the valve unit 33, is connected through a flexible tube 49 with the main air tube 51 of a claw assembly 52 (Fig. 1). This assembly is shown in Fig. 1, in its position when the machine is in transport, in which a hook 53 thereon is hung from a hook 54 formed on an arm 56 extended rearwardly from the rear standard 13.

A main milk tube 57, of the claw assembly 52, is connected through a flexible tube 58 with a milk connection 59 carried on the receptacle cover 34 and open at its inner end to the receptacle space 35. The air tube 51 and milk tube 57 are connected with air and milk lines 61 and 62, respectively, provided on teat cups 63 of a usual inflation type.

Figure 4:
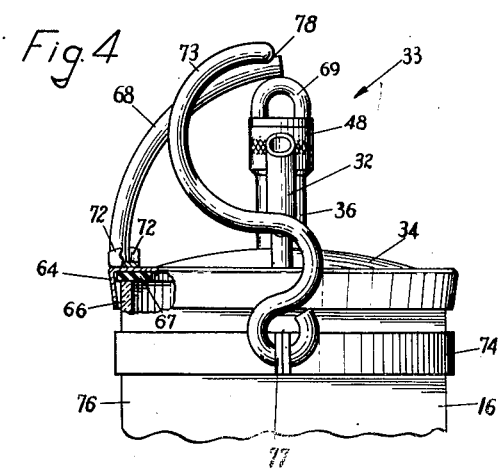
Fig. 4 is a fragmentary side elevational view of the receptacle and the cover therefor, with parts being broken away for the purpose of clarity.

The receptacle cover 34 (Figs. 3 and 4) is integrally formed with a downwardly and inwardly extended marginal flange 64 which fits about the receptacle top rim 66. A flat rubber gasket 67, of a ring shape, is positioned within the cover flange 64 so as to rest on the receptacle rim 66 when the cover is in its receptacle closing position.

The gasket 67 is pressed into fluid sealed engagement with the cover 34 and the rim 66 by the provision of means including an upright outwardly curved arm 68 secured at its upper end to an upright projection 69 swivelly mounted at 71 on the cap member 48. The lower end of the arm 68 is positioned between a pair of spaced upright ears 72 which are carried on the cover 34 at a position near the peripheral edge thereof. The lower end of the arm 68 is removable from its position between the ears 72, only on removal of the cap 48 from the tubular member 36. As a result, when such lower end is between the ears 72 and the cap is tightened, the arm 68 is positively held against rotational movement relative to the cap.

A bail 73 (Figs. 1 and 4) is supported in a usual manner on a ring clamp 74, mounted about a neck portion 76 for the receptacle 16, for swinging movement about pivots 77 across the top of the receptacle 16. With the arm 68 and the cap 48 in their relative assembled positions shown in Fig. 4, the bail 73 is swung upwardly along the arm 68 to an upright position for releasable engagement with the arm at a notch 78 formed in its upper end. The bail 73 is composed of a yieldable rod material so that in its engaged position a downward pressure is applied on the cover 34 whereby the gasket 67 is clamped between the cover 34 and the receptacle rim 66. It is apparent, of course, that prior to the upward swinging movement of the bail, the arm 68 is arranged so as to be in a plane normal to the axes of the pivots 77.

In the operation of the pulsator apparatus, assume the pump piston 19 to be in its bottom position. When the piston 19 is moved upwardly as a result of the operation of the motor 26, air under pressure is discharged through the tube 31 and into the air passage 38 of the valve unit 33. As a result of this high pressure air in the passage 38, the ball valve 42 is maintained in seated engagement with the seat 41, whereby the flow of air at high pressure is continued through the rear air connection 39 and the tube 49 to the main air tube 51 of the claw assembly 52, whereby to collapse the inflations of the teat cups 63.

On the suction, or downstroke of the piston 19, air is exhausted from the tube 31, passage 38, tube 49 and the air tube 51 whereby the inflations in the teat cups 63 are permitted to expand. As a result of the exhausting of air from these parts, the ball valve 42 is moved upwardly to its dotted line position shown in Fig. 3, so that air is concurrently exhausted from the space 35 of the receptable 16. It is seen, therefore, that on each exhaust or upstroke cycle of the piston 19, the receptacle space 35 is sealed or closed from communication with the air connections 32 and 39, and on each downstroke or suction cycle of the piston 19, that air is exhausted therefrom. The air within the space 35 is thus at a sub-atmospheric pressure to provide for a flow of milk from the milk tube 57 and through the tube 58 into the receptacle.

Figure 2:
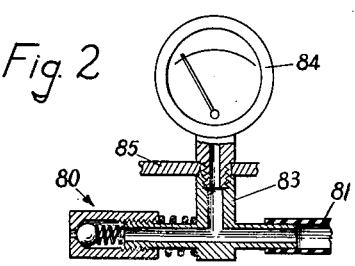
Fig. 2 is an enlarged vertical longitudinal sectional view of a bleeder valve, shown generally in Fig. 1, for maintaining the air in the milk receptacle at a predetermined sub-atmospheric pressure.

The sub-atmospheric pressure of the air in the receptacle 16 is maintained at a substantially constant predetermined value by the provision of a usual type bleeder valve 80 (Figs. 1 and 2) which is connected in an air line 81 open at one end 82 to the receptacle space 35 and provided at its other end 83 with an air gage 84 mounted on a bracket 85 extended rearwardly from the rear standard 13. By merely adjusting the bleeder valve 80 a desired amount of atmospheric air is admitted to the receptacle space 35 concurrently with the suction action of the pump 17. It is to be understood, of course, that the valve 80, under some conditions of operation, may be entirely closed.

Figure 5:
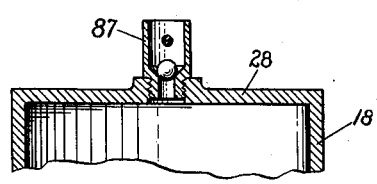
Fig. 5 is an enlarged fragmentary sectional view taken along the line 5—5 in Fig. 1.

Since the delivery of high pressure air by the pump 17, for a size of the piston 19 required to develop a desired sub-atmospheric pressure of the air in the teat cups 63 and receptacle 16, may be relatively great, a one-way bleeder valve 87 (Figs. 1 and 5) is provided on the cylinder head 28. Thus on each upstroke or exhaust cycle of the piston 19 air is discharged through the bleeder valve 87 concurrently with the delivery of air at high pressure through the tube 31.

From a consideration of the above description it is seen that the invention provides an improved pulsator apparatus for a milking machine which is of a simple and compact construction and efficient in operation. The cover 34 is readily removable from the receptacle 16, and on removal of the cap member 48 all of the air and milk passages carried thereon are readily accessible for cleaning purposes. Further, by virtue of the tapered or bent construction of the flange 64, the gasket 67 is positively retained against falling out of the cover on the removal thereof from the receptacle 16.

Although the invention has been described and illustrated with respect to a preferred embodiment thereof, it is to be understood that it is not to be so limited since changes and modifications can be made therein which are within the full intended scope of this invention, as defined by the appended claim.

I claim:

In a milking machine having a milk receptacle and a claw assembly with an air tube and a milk tube, a pulsator apparatus comprising a valve unit carried on a cover for said receptacle and having an upright air passage formed therein open at its lower end to the space within said receptacle and closed at its upper end, a pair of reversely upwardly inclined air connections arranged at opposite sides of said valve unit with their bottom ends open to said passage at positions adjacent the lower end of the passage, a one way ball valve member within said passage at the junction thereof with said air connections, for controlling the flow of air through the lower end of the passage, means for alternately supplying air and exhausting air from one of said air connections, a first conduit means connecting the other of said air connections with said air tube, a second conduit means connecting said milk tube with said receptacle space, said valve member being in a closed position when air is supplied to said one connection, and movable upwardly to an open position when air is exhausted from said one connection, whereby to provide for a sub-atmospheric pressure of the air in the space within said receptacle, and stop means in said passage for limiting the upward movement of said valve member at a position to prevent closing of the bottom ends of said air connections.

JESSE R. LOWRY.

REFERENCES CITED

The following references are of record in the file of this patent:

UNITED STATES PATENTS

| Number | Name | Date |
|---|---|---|
| 1,163,161 | Leitch | Dec. 7, 1915 |
| 1,218,125 | Sharples | Mar. 6, 1917 |
| 1,432,654 | Anderson | Oct. 17, 1922 |
| 2,361,970 | Schmitt | Nov. 7, 1944 |